United States Patent [19]

Waters et al.

[11] 3,750,525

[45] Aug. 7, 1973

[54] COLLAPSIBLE THREADED INSERT DEVICE

[75] Inventors: Kenneth A. Waters; William E. Waters, both of Weymouth, Mass.

[73] Assignee: Textron, Inc., Providence, R.I.

[22] Filed: May 3, 1971

[21] Appl. No.: 139,577

[52] U.S. Cl............... 85/70, 151/41.72, 151/41.73
[51] Int. Cl............................................. F16b 13/04
[58] Field of Search...................... 85/70; 151/41.72, 151/41.73, 37

[56] References Cited
UNITED STATES PATENTS

| | | | |
|---|---|---|---|
| 3,229,363 | 1/1966 | Bien................................. | 151/41.72 |
| 3,197,854 | 8/1965 | Rohe et al. ....................... | 85/70 |
| 2,670,021 | 2/1954 | Torresen et al.................. | 85/70 |
| 3,213,914 | 10/1965 | Baumle et al.................... | 151/41.72 |
| 2,201,087 | 5/1940 | Hallowell......................... | 151/37 |
| 2,245,525 | 6/1941 | Dicely.............................. | 151/37 |
| 3,053,300 | 9/1962 | Quinto............................. | 151/41.72 |

*Primary Examiner*—Edward C. Allen
*Attorney*—Webb, Burden, Robinson & Webb

[57] ABSTRACT

An improved collapsible threaded insert device for securing items to a plate-like workpiece of the type consisting of an annular flange portion integrally attached to an internally threaded, collapsible shank portion. The improvement comprises the addition of various mechanical gripping means formed on the undersurface of the flange to frictionally engage the workpiece when the threaded insert device has been collapsibly secured thereto, thus, increasing the resistance to rotation of said insert within the workpiece.

1 Claim, 11 Drawing Figures

INVENTORS
WILLIAM E. WATERS

INVENTORS
WILLIAM E. WATERS

BY Webb, Burden, Robinson, & Webb

COLLAPSIBLE THREADED INSERT DEVICE

This invention relates generally to self-locking threaded anchoring devices and, more particularly, to collapsible threaded anchoring devices which are notably suited for securement in a plate-like workpiece wherein a sufficiently tight union between the workpiece and the insert is required.

There are many instances during the fabrication of certain items wherein the use of a standard nut and bolt arrangement is prohibited. For example, such is the case when a fastener must be attached in a blind hole or where the confines of the fabricated structure are such that it is impossible to gain access to the rear side of the bolt hole.

Heretofore, a frequently used type of internally threaded fastener for overcoming this problem has been the conventional collapsible threaded insert or blind self-locking anchor nut. These conventional threaded insert devices are placed in a hole in the workpiece, which is generally thin gauge sheet or plate stock and then, with the use of a special tool, the inserts are collapsed. Structural components may then be mounted to the workpiece by means of a bolt or screw in conjunction with the threaded insert.

An inherent disadvantage heretofore encountered in using conventional, self-locking anchor inserts has been their tendency to rotate within the workpiece when an excess torque is applied to the bolt or screw. This excess torque may easily be generated if the screw or bolt is slightly oversized or if it has an excess amount of electroplating on its surface. Several prior attempts have been made to correct this rotation problem, but these have proven impractical due to their complicated structural shapes.

Our invention provides a rotation resistant collapsible threaded insert device which is suited for use in securing structural components to a thin sheet or plate-like workpiece.

Our invention further provides an inexpensive, collapsible threaded insert which will resist rotation within the workpiece.

Our invention is a collapsible threaded insert device having mechanical gripping means integrally formed on the underside of its flange to frictionally engage the workpiece after the insert device has been collapsibly secured thereto.

The objects of the invention will become apparent by referring to the accompanying drawings, wherein.

Figure 1:
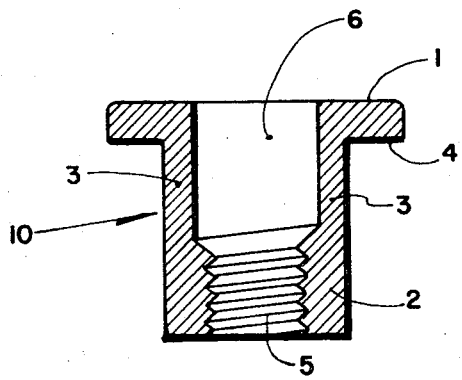
FIG. 1 is a schematic sectional view of a conventional collapsible threaded insert.
Figure 2:
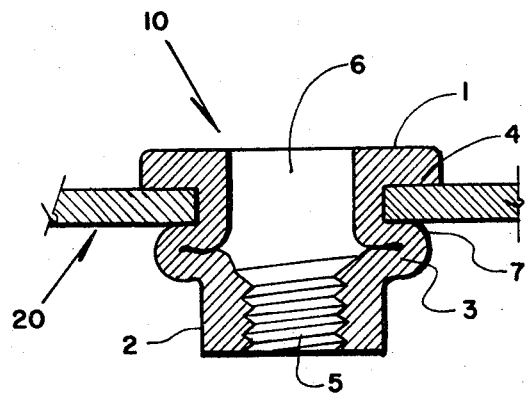
FIG. 2 is a schematic sectional view of a conventional collapsible threaded insert of FIG. 1 after it has been collapsibly secured to the workpiece.

Referring now to the specific details of the drawings, wherein like parts are designated by the same numerals throughout the various figures and similar parts in various embodiments are designated by the use of primed numerals, FIGS. 1 – 2 illustrate the structure of a conventional collapsible threaded insert, generally designated as 10. FIG. 1 shows the insert 10 before it has been secured in a workpiece. An annular flange portion 1 is integrally connected at its undersurface 4 to a cylindrical shank portion 2. An axial bore 6 extends through the insert device and is provided with an internally threaded section 5 located at the end of the shank opposite the flange portion. The annular side wall 3 of the shank portion located between the threaded section 5 and the flange portion 1 is thinner in cross-section than the threaded section and hence, it forms the collapsible section of the shank.

In order to collapsibly secure the threaded insert to a workpiece, a special tool (not shown) is employed. The insert 10 is screwed onto the threaded mandrel of the tool and then placed into the desired hole in the workpiece. The tool exerts a downward force against the insert flange and at the same time the mandrel retracts, the compressive force of which causes the side wall 3 of the shank to collapse. The secured, conventional insert is shown in FIG. 2 wherein the workpiece is indicated as 20. The insert 10 is secured to the workpiece 20 by the compressive action of the flange undersurface 4 of the outer surface of the collapsed side wall 7. A structural component may then be attached to the insert and workpiece by the use of a suitable bolt or screw.

Figure 3:
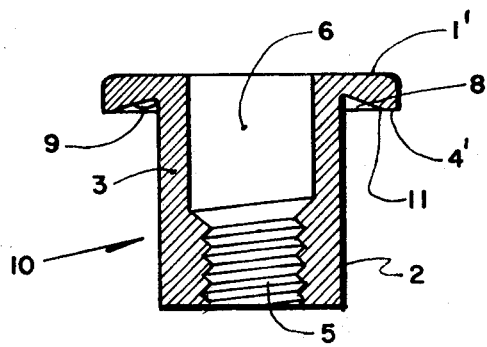
FIG. 3 is a schematic sectional view of one embodiment of our improved threaded insert device.
Figure 5:
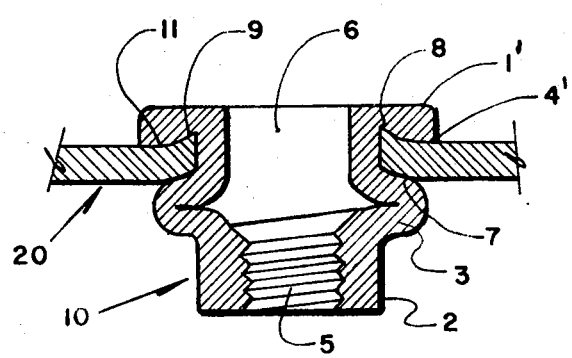
FIG. 5 is a schematic sectional view of the insert device of FIG. 3 after it has been collapsibly secured in the workpiece.
Figure 4:
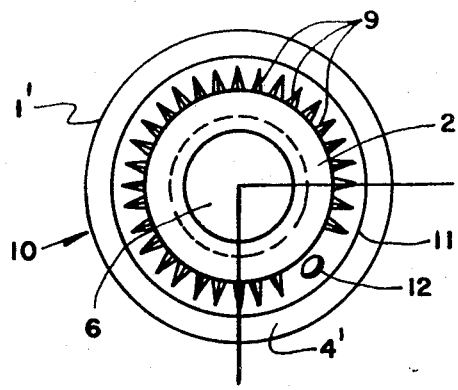
FIG. 4 is a bottom plan view of the insert of FIG. 3.

There are several presently preferred embodiments by which the undersurface of the flange is provided with integral mechanical gripping means so as to increase the frictional locking action between the collapsible insert and the adjacent workpiece material. One of these preferred embodiments is shown in FIGS. 3 – 5. The flange portion 1' contains an annular undercut 8 on its underside surface 4' adjacent to the side wall 3 of the shank portion 2. The conical undercut 8 extends radially outward from the shank portion 2 to a point 11 which is substantially midway between the outer periphery of the flange and the shank. When the insert is collapsibly secured into the workpiece, the side wall 7 of the insert forces the adjacent workpiece material 20 into the conical undercut 8 in wedge-like fashion, FIG. 5.

In order to increase the frictional interaction between the insert device and the workpiece, knurls 9 may be formed about the circumference of the conical undercut 8 adjacent to the side wall 3 of the shank portion 2, FIGS. 3 – 4. These knurls 9 may be formed completely around the circumference of the undercut 8 or they may be interrupted in sections. Both the continuous knurls and the interrupted sections are shown in FIG. 4 for convenience. Where interrupted sections of knurls are employed, raised embossments 12 may be formed on the conical undercut 8 interposed between the knurled sections, FIG. 4. These embossments also serve to increase the frictional locking action between the insert 10 and the workpiece 20. The knurls 9 greatly increase the surface area of the conical undercut 8 which contacts the adjacent workpiece material, thus, affording a greater gripping and wedging action when the insert 10 is anchored in the workpiece.

Figure 6:
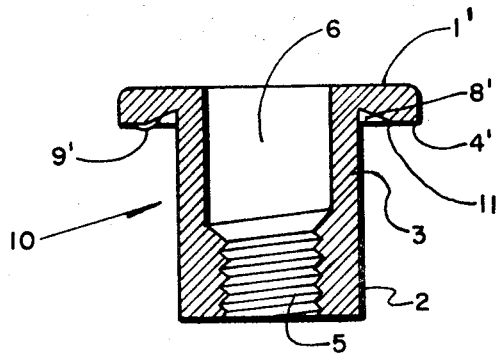
FIG. 6 is a schematic sectional view of another embodiment of our improved threaded insert device.
Figure 7:
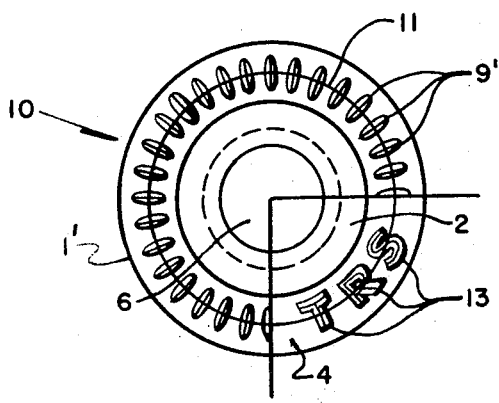
FIG. 7 is a bottom plan view of the insert device of FIG. 6.

An additional preferred embodiment is shown in FIGS. 6 – 7. The conical undercut 8' is similar to the undercut of FIGS. 3–5. In this embodiment, however, the knurls 9' are disposed on the intersection 11 of the conical undercut 8' and the flat undersurface of the flange 4'. Referring specifically to FIG. 7, raised letters 13, such as the manufacturer's trademark, may also be used in place of the knurls. When this insert 10 is collapsibly secured to a workpiece 20, the workpiece is bent upwardly at the intersection point 11 of the conical undercut 8'. The natural wrinkling that occurs in the sheet is guided or shaped to conform to the configuration of the knurls 9' or raised letters 13 located at the bend point 11, thus, greatly increasing the frictional gripping action between the insert and the workpiece.

Figure 8:
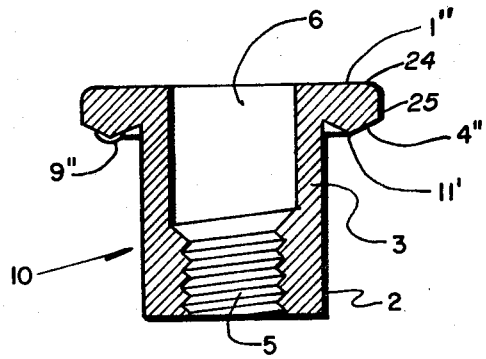
FIG. 8 is a schematic sectional view of another embodiment of our improved threaded insert device.
Figure 9:
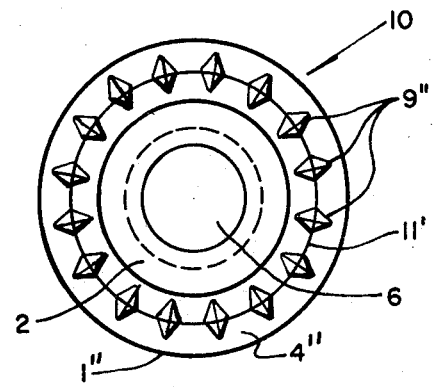
FIG. 9 is a bottom plan view of the insert device of FIG. 8.

A further preferred embodiment is shown in FIGS. 8 – 9. This improved insert has a flange 1'' with an annular undersurface 4'' in the cross-sectional shape of a double angled V. This annular V-shaped undersurface 4'' depends outwardly from the flange 1'' with the point or apex 11' of the V-shape positioned substantially midway between the outer periphery of the flange and the side wall of the shank. Knurls 9'' are also formed on the undersurface 4'' of the flange positioned at the apex 11' of the V and extending around the circumference of the annular flange. When this improved insert is collapsibly secured to the workpiece, the V-shaped undersurface 4'' bites into the workpiece material causing it to bend in a double angle fashion corresponding to the V-shaped undersurface. This accentuated bending of the workpiece, coupled with the gripping action of the knurls, yields a very satisfactory frictional fit between the insert and the workpiece.

The improved insert device 10 of this invention is of the non-flush mounting type. The upper surface portion 24 of annular flange 1, 1' and 1'' remains in spaced relationship from the outer surface of workpiece 20 after insert 10 is collapsibly secured thereto, FIG. 5. As seen in FIGS. 8–9, the non-flush mounting type insert 10 is characterized by the particular configuration of annular flange 1''. The outer periphery of flange 1'' possesses a cylindrically shaped shoulder portion 25 which extends from the annular, upper surface portion 24 of flange 1'' to the outer periphery of annular undersurface 4. The shoulder portion 25 yields a flange 1'' of sufficient thickness and, therefore, of sufficient strength to permit the formation of the double angled "V" undersurface and knurls 9'' thereon.

Figure 10:
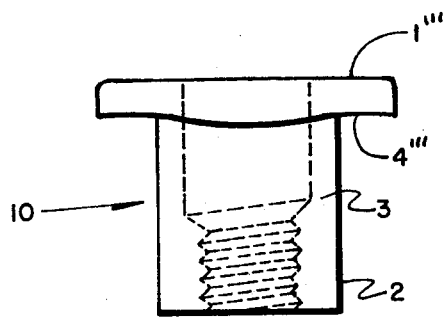
FIG. 10 is a side view of still another embodiment of our improved threaded insert device.
Figure 11:
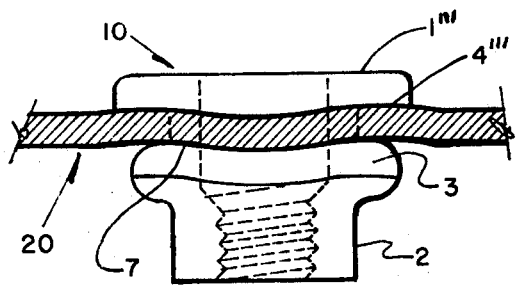
FIG. 11 is a side view of the insert device of FIG. 10 after it has been collapsibly secured in the workpiece.

A still further embodiment of this invention is shown in FIGS. 10 – 11. The threaded insert 10 has a shank portion 2 integrally attached to flange portion 1'''. The annular undersurface 4'''' of the flange is formed in an undulating fashion, i.e. the undersurface is contoured in alternating high and low areas. When this insert 10 is collapsibly secured to the workpiece 20, the waved or undulating undersurface 4'''' bends the workpiece and causes it to deform and follow the undersurface contouring. The collapsed side wall 3 also has an upper gripping surface 7 which is likewise deformed by the flange undersurface in an undulating pattern, thus, creating a union between the insert and the workpiece which is highly resistant to rotational forces, FIG. 11.

In order to demonstrate the increased gripping ability, "torque-out" strength tests were run on several of the improved embodiments herein disclosed and on the conventional threaded insert. All of the inserts were collapsibly secured in a burrless, punched hole using a unform upset load. A torque measuring device was then applied to each insert device. The measuring device indicated the maximum torque required to cause the insert to loosen and turn within the workpiece. These "torque-out" strength values were recorded and an average torque strength was then calculated for each type of insert device tested.

The conventional threaded insert had an average "torque-out" strength of 28 inch-pounds.

The improved insert having an annular undercut with knurls of FIGS. 3 – 5 had an average "torque-out" strength of 90 inch-pounds. This represents an increase of 221 percent over the conventional insert.

The improved insert having the undulating undersurface of FIGS. 10 – 11 had an average "torque-out" strength of 51 inch-pounds. This represents an increase of 82 percent over the conventional insert.

Based on these test results, it is very apparent that our improved threaded insert is significantly more resistant to rotation within the workpiece than is the conventional insert presently known and used in the art.

While the preferred embodiments of the present invention have been shown and described herein, it is obvious that many structural details may be changed without departing from the spirit and scope of the appended claims.

We claim:

1. An improved, collapsible threaded insert device for securing items to a plate-like workpiece, said insert being the blind press type, wherein an annular flange portion is integrally attached at its undersurface to a hollow, internally threaded shank portion, the annular, cylindrical sidewall of which is collapsible adjacent to the undersurface of the flange portion, said annular flange portion being of the non-flush mounting type, wherein the improvement comprises: an annular flange portion having an undersurface formed in cross-section in the shape of a double-angled "V", said annular V-shaped undersurface depending outwardly from said flange, the inner surface of said V-shaped annular undersurface extending from the external cylindrical surface of the shank portion outwardly to the apex of said V-shaped undersurface, the apex of said V-shaped undersurface located substantially midway between the shank and the outside periphery of the flange, said annular flange portion having its greatest thickness at the apex of the said V-shaped undersurface with said flange thickness gradually decreasing toward the shank and toward the outside periphery of the flange, said flange also having a cylindrically shaped shoulder portion extending from the outer periphery of the upper surface portion of said flange to the outer periphery of the V-shaped undersurface, said undersurface also having a plurality of knurls disposed in spaced relationship thereon, said knurls positioned at the apex of said V-shaped surface.

* * * * *

UNITED STATES PATENT OFFICE
CERTIFICATE OF CORRECTION

Patent No. 3,750,525                    Dated   August 7, 1973

Inventor(s)   William E. Waters

It is certified that error appears in the above-identified patent and that said Letters Patent are hereby corrected as shown below:

On the first page of the Patent
    --Inventors: Kenneth A. Waters; William E. Waters, both of Weymouth, Mass.-- should read --Inventor: William E. Waters of Weymouth, Mass.--
    Column 2 Line 38 --undersurface-- should read --underside--.
    Column 4 Line 33 --We claim:-- should read --I claim:--

Signed and sealed this 27th day of November 1973.

(SEAL)
Attest:

EDWARD M. FLETCHER, JR.  
Attesting Officer

RENE D. TEGTMEYER  
Acting Commissioner of Patents